(12) United States Patent
Tammpere

(10) Patent No.: US 11,509,002 B2
(45) Date of Patent: Nov. 22, 2022

(54) BATTERY PACK

(71) Applicant: ALELION ENERGY SYSTEMS AB, Gothenburg (SE)

(72) Inventor: Peter Tammpere, Mölndal (SE)

(73) Assignee: ALELION ENERGY SYSTEMS AB, Gothenburg (SE)

( * ) Notice: Subject to any disclaimer, the term of this patent is extended or adjusted under 35 U.S.C. 154(b) by 164 days.

(21) Appl. No.: 16/966,937

(22) PCT Filed: Jan. 31, 2019

(86) PCT No.: PCT/SE2019/050078
§ 371 (c)(1),
(2) Date: Aug. 3, 2020

(87) PCT Pub. No.: WO2019/156612
PCT Pub. Date: Aug. 15, 2019

(65) Prior Publication Data
US 2021/0050636 A1  Feb. 18, 2021

(30) Foreign Application Priority Data
Feb. 9, 2018  (SE) .................................... 1850141-1

(51) Int. Cl.
*H01M 10/615* (2014.01)
*H01M 10/657* (2014.01)
(Continued)

(52) U.S. Cl.
CPC ..... *H01M 10/615* (2015.04); *H01M 10/0525* (2013.01); *H01M 10/482* (2013.01);
(Continued)

(58) Field of Classification Search
CPC .......... H01M 10/615; H01M 10/0525; H01M 10/482; H01M 10/486; H01M 10/625;
(Continued)

(56) References Cited

U.S. PATENT DOCUMENTS

| 10,367,239 B1 | 7/2019 | Dao et al. |
| 2011/0288704 A1 | 11/2011 | Schwarz et al. |
| 2018/0331440 A1* | 11/2018 | Okamoto ............ H01M 50/507 |

FOREIGN PATENT DOCUMENTS

| CN | 204927459 U | * 12/2015 | .......... H01M 10/615 |
| CN | 103515671 B | 8/2016 | |

(Continued)

OTHER PUBLICATIONS

Supplementary European Search Report for European Application No. 19750510, dated Sep. 16, 2021.
(Continued)

*Primary Examiner* — Kaity V Chandler
(74) *Attorney, Agent, or Firm* — Birch, Stewart, Kolasch & Birch, LLP

(57) ABSTRACT

A battery pack includes a plurality of battery cells, wherein each of the battery cells is provided with first and second terminals connected to first and second cell electrodes, respectively; a first conductor electrically connecting at least a first and a second battery cell via one of the terminals of each of the first and second battery cells; and an electric heating element arranged to allow heating of at least the first and second battery cells via heating of the first or second
(Continued)

terminal thereof. The battery pack includes at least a first metal plate capable of conducting both electric current and heat, wherein the first metal plate forms the first conductor and wherein the electric heating element is arranged onto the first metal plate so as to allow heating of at least the first and second battery cells via the first metal plate and further via the terminals connected to the first metal plate.

18 Claims, 3 Drawing Sheets

(51) Int. Cl.
*H01M 10/48* (2006.01)
*H01M 10/0525* (2010.01)
*H01M 10/63* (2014.01)
*H01M 10/6554* (2014.01)
*H01M 10/625* (2014.01)

(52) U.S. Cl.
CPC ....... *H01M 10/486* (2013.01); *H01M 10/625* (2015.04); *H01M 10/63* (2015.04); *H01M 10/657* (2015.04); *H01M 10/6554* (2015.04); *H01M 2220/20* (2013.01)

(58) Field of Classification Search
CPC ............. H01M 10/63; H01M 10/6554; H01M 10/657; H01M 2220/20; Y02E 60/10
See application file for complete search history.

(56) References Cited

FOREIGN PATENT DOCUMENTS

| CN | 206210987 U | 5/2017 | | |
|---|---|---|---|---|
| DE | 10 2008 005 891 A1 | 7/2009 | | |
| DE | 10 2011 109 969 A1 | 2/2013 | | |
| JP | 2009118729 A | * 5/2009 | ............ | Y02E 60/12 |
| JP | 2010097923 | * 4/2010 | ............ | Y02E 60/12 |
| JP | 2010097923 A | * 4/2010 | ............ | Y02E 60/12 |
| WO | WO 2015/157106 A1 | 10/2015 | | |
| WO | WO-2017176462 A1 | * 10/2017 | .......... | H01M 10/425 |

OTHER PUBLICATIONS

International Search Report, issued in PCT/SE2019/050078, dated Feb. 21, 2019.
Written Opinion of the International Searching Authority, issued in PCT/SE2019/050078, dated Feb. 21, 2019.

* cited by examiner

BATTERY PACK

TECHNICAL FIELD

This invention relates to a battery pack according to the preamble of claim 1. In particular, the invention relates to heating of battery packs.

BACKGROUND OF THE INVENTION

The interest of using electric energy sources in the form of battery packs is growing, for instance in applications like electrically-propelled vehicles. Such a vehicle has a relatively large battery pack including a plurality of battery cells that are intended to operate within a certain temperature interval. Focus is commonly set on avoiding over-heating of battery cells but also heating of battery packs is important to achieve a proper electric output in low-temperature situations.

Conventionally, battery packs are cooled or heated by regulating the temperature in an enclosed space where the battery pack is located. This is simple but may not be efficient enough or may not be practically possible.

Many cooling and heating systems for battery packs include an integrated cooling system through which a fluid coolant is allowed to circulate and transfer heat to or from the cells. Such systems may be rather effective with regard to temperature regulation but make the battery pack more complicated and costly.

DE102008005891A1 discloses a heating arrangement for a battery pack where a heating element is arranged onto a portion of the pole of the battery cell. A disadvantage of the arrangement of DE102008005891A1 is that a large number of small pole-connecting components would be needed to heat all cells of a large battery pack, which is likely to make such a large battery pack complex and costly to produce.

Further improvements are needed in the field of temperature management of battery packs, in particular with regard to non-complex and efficient heating systems for large battery packs in vehicle applications.

SUMMARY OF THE INVENTION

The invention concerns a battery pack comprising: a plurality of battery cells, wherein each of the battery cells is provided with first and second terminals connected to first and second cell electrodes, respectively; a first conductor electrically connecting at least a first and a second battery cell via one of the terminals of each of the first and second battery cells; and an electric heating element arranged to allow heating of at least the first and second battery cells via heating of the first or second terminal thereof.

The invention is characterized in that the battery pack comprises at least a first metal plate capable of conducting both electric current and heat, wherein the first metal plate forms the first conductor and wherein the electric heating element is arranged onto the first metal plate so as to allow heating of at least the first and second battery cells via the first metal plate and further via the terminals connected to the first metal plate.

This allows for a robust and non-complex battery pack using e.g. an aluminium metal plate that may be spot welded to the terminals and arranging a heat tape or similar onto the metal plate. This means that the electric heating element is not in direct thermal contact with the terminals. Also the assembling of such a battery pack can be made more efficient compared to e.g. DE102008005891A1 where a larger number of smaller components are involved. This is in particular valid for large battery packs containing many battery cells. In addition, the heating can be made more efficient since the entire terminal surface can be used for heat transfer.

In an embodiment of the invention the battery pack comprises a temperature sensor arranged in thermal contact with at least one of the battery cell terminals that are not connected to the first metal plate. Such a temperature sensor is suitable in the controlling of the electric heating element since it provides information on the temperature inside the cell (via the electrode that is not heated by the metal plate but instead heated via an electrolyte that is in contact with both electrodes inside the cell).

In an embodiment of the invention the battery pack comprises a second metal plate capable of conducting both electric current and heat, wherein the second metal plate is connected to at least one of the battery cell terminals that are not connected to the first metal plate, and wherein the temperature sensor is arranged onto the second metal plate. Also the second metal plate is useful for making the battery pack robust and for simplifying the assembling. Further, the second metal plate forms suitable component for attachment of the temperature sensor. Besides that the exact positioning of the temperature sensor becomes less critical (since the plate conducts heat), one temperature sensor may serve two or more cells by letting the plate extend along the cells.

In an embodiment of the invention the heating element is provided with an electrically conducting arrangement that heats up when subject to an electric current. To avoid short circuits, the conducting arrangement should be electrically insulated. Preferably, the heating element is a flexible piece of material, such as a heating tape. A heating tape can easily be fixed onto the metal plate.

In an embodiment of the invention an electric insulation is provided between the electric heating element and the metal plate it is arranged onto. The insulation may form an integral part of the heating element.

In an embodiment of the invention the battery cells are arranged side by side with the terminals arranged in two rows and wherein the first battery cell is arranged adjacent to the second battery cell. Simple straight metal plates can thereby be used for connection of the terminals.

In an embodiment of the invention the battery cells are arranged in opposite directions so that the first terminal of the first battery cell is arranged in the same row of terminals as the second terminal of the second battery cell, wherein the first metal plate is connected to the first terminal of the first battery cell and to the second terminal of the adjacent second battery cell so as to connect the first and second battery cells in series. Several short metal plates can be used in such a series-connection embodiment.

In a variant of such a series-connection embodiment the second metal plate is connected to the first terminal of the second battery cell and to the second terminal of a third battery cell adjacent the second battery cell, wherein the battery pack comprises a third metal plate capable of conducting both electric current and heat, wherein the third metal plate is connected to the first terminal of the third battery cell and to the second terminal of a fourth battery cell adjacent the third battery cell, and wherein the electric heat element extends from the first metal plate to the third metal plate and is arranged also onto the third metal plate so as to allow heating of the third and fourth battery cells via the third metal plate and further via the terminals connected to the third metal plate. The same electric heating element, e.g.

a heat tape, can thus extend along the battery pack be used to heat more than one metal plate.

In another embodiment where the battery cells are arranged side by side and the terminals are arranged in rows, the battery cells are arranged in similar directions so that the first terminal of the first battery cell is arranged in the same row of terminals as the first terminal of the second battery cell, wherein the first metal plate is connected to the first terminal of the first battery cell and to the first terminal of the second battery cell so as to connect the first and second battery cells in parallel. One single metal plate can thus connect all first (or second) terminals of all the cells in the battery pack, also when there are more than two cells. The heating element may extend onto the metal plate along the battery pack.

In a variant of such a parallel-connection embodiment the second metal plate is connected to the second terminal of the first battery cell and to the second terminal of the second battery cell. Also the second metal plate may extend along the battery pack, typically on an opposite side of the battery pack in relation to the first metal plate. Such an extended second metal plate may be provided with one or more temperature sensors.

In another embodiment where the battery cells are arranged side by side and the terminals are arranged in rows, the battery pack comprises a first and a second set of battery cells, wherein each set of battery cells are connected in parallel and wherein the two sets of battery cells are connected in series, wherein the first and second battery cells form part of the first set of battery cells, and wherein the second metal plate is connected to the second terminal of each battery cell in the first set of battery cells as well as to the first terminal of each battery cell in the second set of battery cells. Thus, the second metal plate forms the main series connection between the two sets of battery cells. This provides for a robust and compact version of a battery pack comprising two sets of battery cells.

In a variant of such a two-set embodiment a second electric heating element is arranged onto the second metal plate in a position that is closer to the first terminals of the battery cells in the second set of battery cells than to the second terminals of the battery cells in the first set of battery cells. Preferably, the second heating element is arranged as close as possible to the first terminals of the battery cells in the second set of battery cells, for instance at the same horizontal position but on opposite sides of the second metal plate, and as far as possible away from the second terminals of the battery cells in the first set of battery cells. Thereby, the second metal plate can be used for heating the second set of battery cells without interfering too much with the heating or temperature measurements of the first set of battery cells. Preferably, the temperature sensor is arranged onto the second metal plate in a position that is closer to the second terminals of the battery cells in the first set of battery cells than to the first terminals of the battery cells in the second set of battery cells. If the (lateral) distance between the second electric heating element and the temperature sensors relating to the heating control of the first set of battery cells is sufficient, i.e. if a width of the second metal plate is sufficient, the second electric heating element may not interfere significantly with the heating process related to the first set of battery cells (since the heat transferred from the second heating element to the second metal plate will primarily be transferred through the metal plate to the terminals of the second set of cells and only to a small extent be transferred laterally towards the temperature sensors related to the first set of cells).

In an embodiment of the invention each battery cell comprises a casing enclosing the first and second cell electrodes and wherein the casing is electrically connected to the second cell electrode. It is more efficient to heat the first electrodes/terminals, and thus to arrange the temperature sensors used for controlling the heating process in connection with the second electrodes/terminals, because heat transferred to the first electrodes will be transferred to the inside of the cell to a higher extent than heat transferred to the second electrodes. The reason for this is that, in the latter case, some heat will leave the cell via the casing that is in direct contact with the second electrode. In a case where the cells are connected in series it is difficult to heat all the cells only via the first electrode/terminal (if using a connecting metal plate provided with a heating element as described in this disclosure). However, in the cases where the battery pack contains one or more sets of cells connected in parallel the first metal plate and the electric heating element is connected to a row of first terminals/electrodes, which thus makes the heating more efficient.

In an embodiment of the invention the battery pack comprises a control system configured to control the electric heating element, wherein the control system is connected to the temperature sensor and arranged to control the electric heating element at least partly based on a signal obtained from the temperature sensor.

In an embodiment of the invention the first metal plate is connected to the terminals by means of spot welding.

In an embodiment of the invention the first metal plate is made of aluminium.

In an embodiment of the invention the battery cells are prismatic Li-ion cells.

BRIEF DESCRIPTION OF DRAWINGS

In the description of the invention given below reference is made to the following figure, in which.

DESCRIPTION OF EXAMPLE EMBODIMENTS OF THE INVENTION

Figure 1:
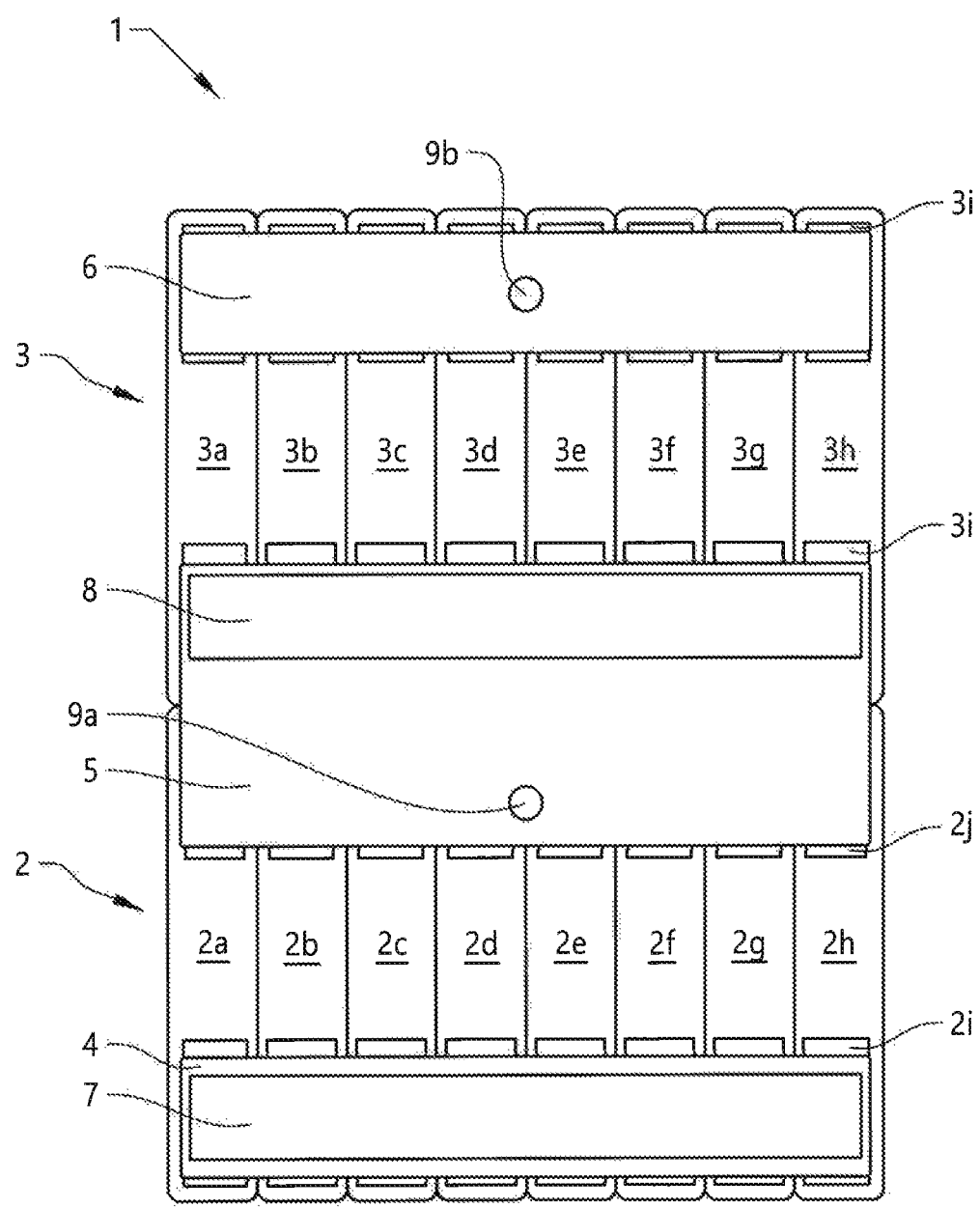
FIG. 1 shows a top view of a first embodiment of a battery pack according to the invention.

FIG. 1 shows a top view of a first embodiment of a battery pack 1. In this example the battery pack 1 comprises a first and a second set of battery cells 2, 3. The first set 2 comprises eight battery cells 2a-2h and the second set 3 comprises eight battery cells 3a-3h. All battery cells 2a-2h, 3a-3h are similar and each battery cell is provided with first and second terminals 2i, 2j, 3i, 3j (see battery cells 2h and 3h) connected to first and second cell electrodes, respectively. All batteries are of a Li-ion type.

In each set of battery cells 2, 3, the battery cells 2a-2h, 3a-3h are arranged side by side with the terminals 2i, 2j, 3i, 3j arranged in two rows. The battery cells are in this case oriented in the same direction so that the first terminals 2i, 3i of each battery cell 2a-2h, 3a-3h in each set of cells 2, 3 are arranged in the same row of terminals. With reference to FIG. 1, the row of terminals at the bottom of the figure is made up of the eight first terminals 2i of the first set of cells 2a-2h. The next row of terminals is the row of second terminals 2*j* of the first set of cells 2*a*-2*h*. Upwards in FIG. 1 follows the row of first terminals 3*i* of the second set of cells 3*a*-3*h* and, at the top, the row of second terminals 3*j* of the second set of cells 3*a*-3*h*.

A first straight and flat aluminium plate 4 is connected to all first terminals 2*i* of the first set of cells 2*a*-2*h* and a second, similar but larger, aluminium plate 5 is connected all second terminals 2*j* of the first set of cells 2*a*-2*h*. The second aluminium plate 5 extends towards and above the second set of cells 3 and is connected also to all first terminals 3*i* of the second set of cells 3*a*-3*h*. A third aluminium plate 6, that is similar to the first plate 4, is connected to all second terminals 3*j* of the second set of cells 3*a*-3*h*.

All aluminium plates 4-6 (and also other aluminium plates shown in the other figures) are connected to the terminals by spot welding, which provides for good electric and thermal connection as well as for efficient production/assembling of the battery pack 1. The aluminium plates are good conductors for both electric current and heat.

Each set of battery cells 2, 3 is thus connected in parallel, via first and second plates 4,5 and second and third plates 5, 6, respectively, and the two sets of battery cells 2, 3 are connected in series, via the second plate 5. The battery pack 1 is further provided with main contacts (not shown in the figures).

The battery pack 1 is further provided with a first electric heating element 7 in the form of a heating tape arranged onto the first aluminium plate 4 so as to allow heating of all battery cells 2*a*-2*h* of the first of set of battery cells 2 via the first aluminium plate 4 and further via the terminals 2*i*.

The first heating tape 7 is provided with an electrically conducting arrangement that heats up when subject to an electric current. The tape 7 is electrically insulated.

Each battery cell 2*a*-2*h*, 3*a*-3*h* comprises a casing enclosing the first and second cell electrodes and the casing is electrically connected to the second cell electrode (and thus also to the second terminal 2*j*, 3*j*, which forms a plus pole in the examples shown here). This means in turn that the first electrodes of the battery cells 2*a*-2*h*, 3*a*-3*h* are not connected to the cell casing (but only to the corresponding first terminal 2*i*, 3*i*, which forms a minus pole in the examples shown here).

The first heating tape 7 thus transfers the heat to the first electrodes of the battery cells 2*a*-2*h* (via the first aluminium plate 4 and the first terminals 2*i*). This is more efficient than heating the second electrodes since heating of the second electrodes, via the second terminals 2*j*, would to a greater extent lead to heating of the casing of the cells 2*a*-2*h* and to a greater heat loss to the surroundings.

The battery pack 1 is further provided with a second heating tape 8 that is of a similar type as the first heating tape 7. The second heating tape 8 is arranged onto the second aluminium plate 5 in a position corresponding to that of the first terminals 3*i* of the second set 3 of battery cells 3*a*-3*h*, i.e. the second heating tape 8 is placed right on top of the first terminals 3*i* with the second plate 5 placed in between.

The battery pack 1 further comprises a first temperature sensor 9*a* arranged onto the second aluminium plate 5 positioned on top of the second terminals 2*j* of the first set of battery cells and in the middle of the cells 2*a*-2*h*. The first temperature sensor 9*a* is thus in thermal contact with the battery cell terminals 2*j* that are not connected to the first aluminium plate 4. The first temperature sensor 9*a* is capable of indicating quite well the temperature inside the battery cells 2*a*-2*h* of the first set of cells 2 (since the heat is transferred into the cell via the first electrode and is conducted via an electrolyte to the second electrode and further via the second terminal and via the second aluminium plate 5 to the sensor 9*a*). The first temperature sensor 9*a* is placed sufficiently far away from the second heating tape 8 to avoid too much interference from heating of the second plate 5.

A similar second temperature sensor 9*b* is arranged onto the third aluminium plate 6 for indicating the temperature of the cells 3*a*-3*h* in the second set of cells 3.

The battery pack 1 further comprises a control system (not shown) configured to control the electric heating elements 7, 8. The control system is connected to the first and second temperature sensors 9*a*, 9*b* and is arranged to control the electric heating elements 7, 8 individually and at least partly based on signals obtained from the first and second temperature sensors 9*a*, 9*b*.

Figure 2:
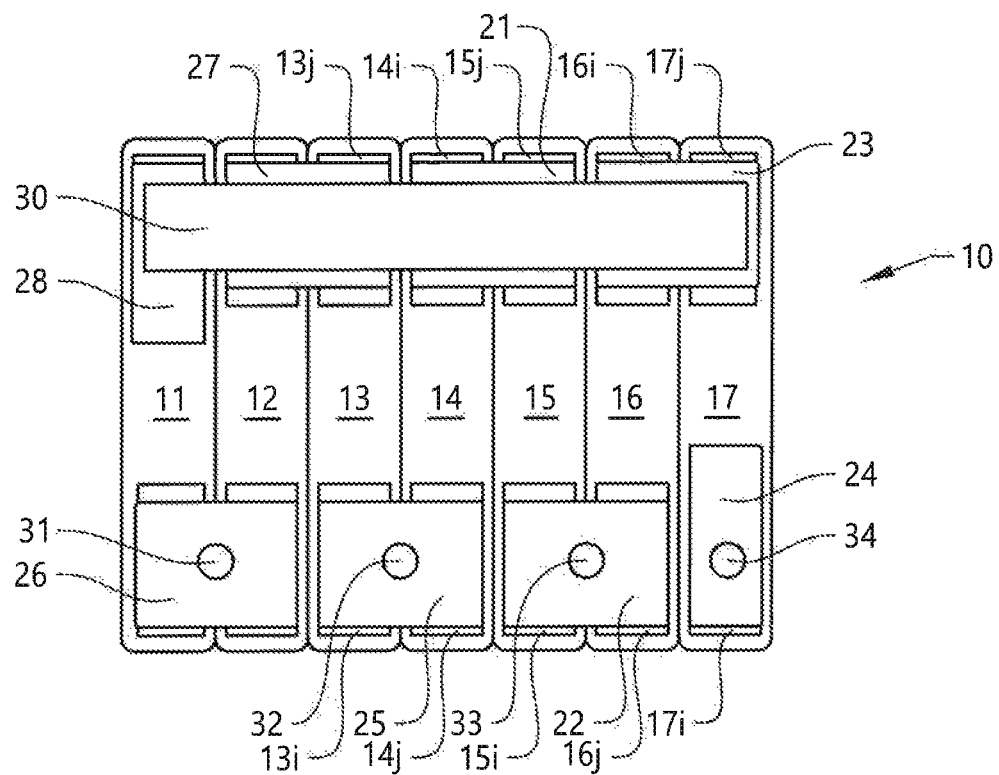
FIG. 2 shows a top view of a second embodiment of a battery pack according to the invention.

FIG. 2 shows a top view of a second embodiment of a battery pack 10. The pack 10 comprises seven battery cells 11-17 that in this case are connected in series. Each individual cell is of the same type as described in relation to FIG. 1, and also in this case the cells 11-17 are arranged side by side with the terminals arranged in a row. However, in this case the battery cells 11-17 are arranged in opposite directions so that the first terminal of a first battery cell, such as terminal 14*i* of battery cell 14, is arranged in the same row of terminals as the second terminal of a second adjacent battery cell, such as terminal 15*j* of battery cell 15.

A first aluminium plate 21 is connected to the first terminal of the first battery cell, such as terminal 14*i* of battery cell 14, and to the second terminal of the adjacent second battery cell, such as terminal 15*j* of battery cell 15, so as to connect the first and second battery cells in series.

A second aluminium plate 22 is connected to the first terminal of the second battery cell, such as terminal 15*i* of battery cell 15, and to the second terminal of a third battery cell, such as terminal 16*j* of battery cell 16, adjacent the second battery cell. The battery pack 10 further comprises a third aluminium plate 23 that is connected to the first terminal of the third battery cell, such as terminal 16*i* of battery cell 16, and to the second terminal of a fourth battery cell, such as terminal 17*j* of battery cell 17, adjacent the third battery cell 16.

An electric heating tape 30 (similar to what is described above) extends from the first plate 21 to the third plate 23 and is arranged onto the first and third aluminium plates 21, 23 so as to allow heating of the first to fourth battery cells 14-17 via the first and third aluminium plates 21, 23 and further via the terminals 14*i*, 15*j*, 16*i*, 17*j* connected to these plates.

As can be seen in FIG. 2, the battery pack 10 comprises further aluminium plates 24-28 and the heating tape 30 extends and is arranged onto some of these further plates.

First to fourth temperature sensors 31-34 for use in controlling the heating tape 30 are arranged onto the aluminium plates 22, 24, 25, 26 that are not provided with the heating tape 30. The battery pack 10 comprises also in this case a control system (not shown) configured to control the electric heating element 30. The control system is connected to the first to fourth temperature sensors 31-34 and is arranged to control the electric heating element 30 at least partly based on signals obtained from the temperature sensors 31-34.

Figure 3:
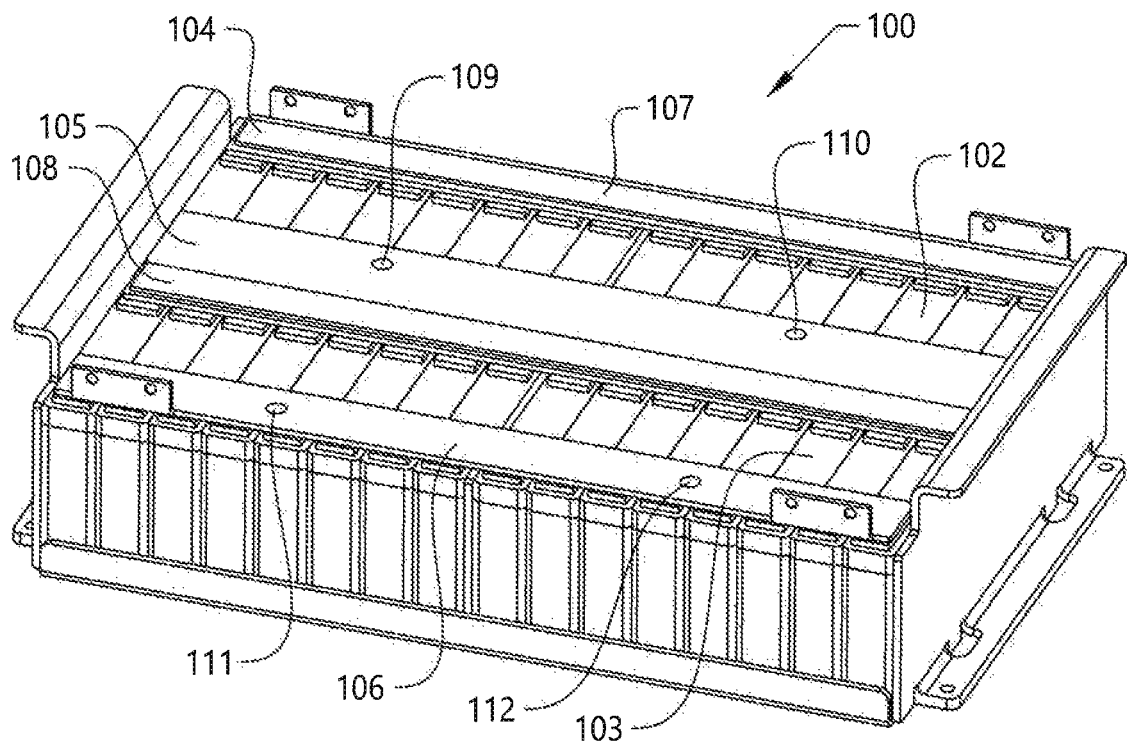
FIG. 3 shows a perspective view of a third embodiment of a battery pack according to the invention.

FIG. 3 shows a perspective view of a third embodiment of a battery pack 100. This embodiment is similar to the first embodiment shown in FIG. 1 with two sets of battery cells and with the cells connected in parallel within each set and with the two sets connected in series. The individual cells are similar to what has been described above.

Each set of battery cells 102, 103 comprises in this case sixteen battery cells. A first aluminium plate 104 (partly hidden) connects all first terminals of the battery cells in the first set of cells 102, a second aluminium plate 105 connects both all second terminals in the first set of cells 102 as well as all first terminals in the second set of cells 103, and a third aluminium plate 106 connects all second terminals in the second set of cells 103.

A first electric heating element 107 is arranged onto the first aluminium plate 104 and a second electric heating element 108 is arranged onto the second aluminium plate 105 in similarity with what is described in relation to FIG. 1.

The battery pack 100 is further provided with four temperature sensors 109-112 for controlling the heating process in line with what has already been described above. Two of the sensors 109, 110 are arranged onto the second plate 105 and two sensors 111, 112 are arranged onto the third plate 106.

Figure 4:
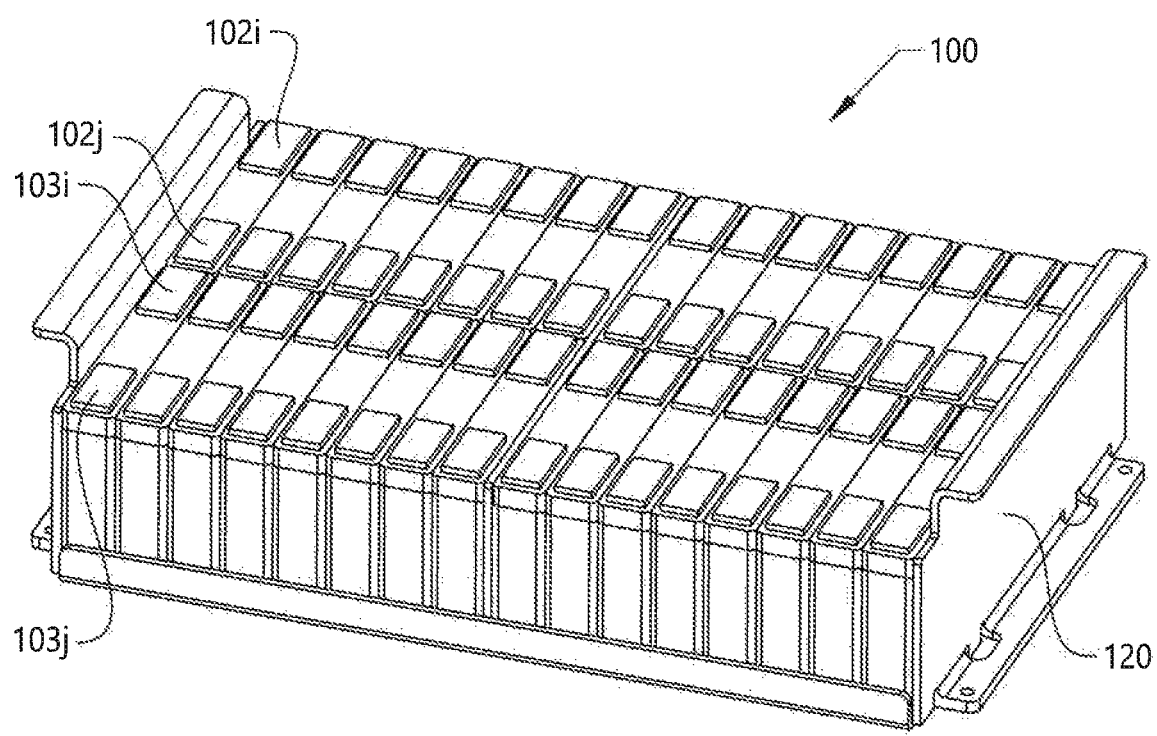
FIG. 4 shows the embodiment of FIG. 3 with some parts removed.

FIG. 4 shows the battery pack 100 without the plates and heaters; only the battery cells and a rack 120 for holding the cells in place are shown. FIG. 4 shows clearly the rows of terminals including, from the top and downwards in the figure, a first row containing the first terminals 102$i$ of the first set of cells 102, a second row containing the second terminals 102$j$ of the first set of cells 102, a third row containing the first terminals 103$i$ of the second set of cells 103, and a fourth row containing the second terminals 103$j$ of the second set of cells 103. Also in this case the cells are heated via the first terminals 102$i$, 103$i$.

The invention is not limited by the embodiments described above but can be modified in various ways within the scope of the claims. For instance, the battery pack may contain a different number a different type of cells, and the number of sets of cells connected in parallel may be only one or more than two. Further, the metal plate(s) may be made of e.g. steel or cupper instead of aluminium. Further, one or more additional temperature sensors may be arranged onto the first or third metal plates for controlling the operation of the cells, and for regulating a maximum temperature of the heating elements. Moreover, the heating element may be a heating cable/wire or a heating film/foil.

The invention claimed is:

1. A battery pack, comprising:
a plurality of battery cells, wherein each of the battery cells is provided with first and second terminals connected to first and second cell electrodes, respectively;
a first conductor electrically connecting at least a first and a second battery cell via one of the terminals of each of the first and second battery cells;
an electric heating element arranged to allow heating of at least the first and second battery cells via heating of the first or second terminal thereof;
at least a first metal plate capable of conducting both electric current and heat, wherein the first metal plate forms the first conductor and wherein the electric heating element is arranged onto the first metal plate so as to allow heating of at least the first and second battery via the first metal plate and further via the terminals connected to the first metal plate; and
a temperature sensor arranged in thermal contact with at least one of the battery cell terminals that are not connected to the first metal plate, and a second metal plate capable of conducting both electric current and heat, wherein the second metal plate is connected to at least one of the battery cell terminals that are not connected to the first metal plate, and wherein the temperature sensor is arranged onto the second metal plate.

2. The battery pack according to claim 1, wherein the second metal plate is connected to the first terminal of the second battery cell and to the second terminal of a third battery cell adjacent the second battery cell, wherein the battery pack comprises a third metal plate capable of conducting both electric current and heat, wherein the third metal plate is connected to the first terminal of the third battery cell and to the second terminal of a fourth battery cell adjacent the third battery cell, and wherein the electric heating element extends from the first metal plate to the third metal plate and is arranged also onto the third metal plate so as to allow heating of the third and fourth battery cells via the third metal plate and further via the terminals connected to the third metal plate.

3. The battery pack according to claim 1, wherein the second metal plate is connected to the second terminal of the first battery cell and to the second terminal of the second battery cell.

4. The battery pack according to claim 3, wherein the battery pack comprises a first and a second set of battery cells, wherein each set of battery cells are connected in parallel and wherein the two sets of battery cells are connected in series, wherein the first and second battery cells form part of the first set of battery cells, and wherein the second metal plate is connected to the second terminal of each battery cell in the first set of battery cells as well as to the first terminal of each battery cell in the second set of battery cells.

5. The battery pack according to claim 4, wherein a second electric heating element is arranged onto the second metal plate in a position that is closer to the first terminals of the battery cells in the second set of battery than to the second terminals of the battery cells in the first set of battery cells.

6. The battery pack according to claim 4, wherein the temperature sensor is arranged onto the second metal plate in a position that is closer to the second terminal of the battery cells in the first set of battery cells than to the first terminals of the battery cells in the second set of battery cells.

7. The battery pack according to claim 1, wherein the heating element is provided with an electrically conducting arrangement that heats up when subject to an electric current.

8. The battery pack according to claim 1, wherein the heating element is a flexible material.

9. The battery pack according to claim 1, wherein an electric insulation is provided between the electric heating element and the metal plate it is arranged onto.

10. The battery pack according to claim 1, wherein the battery is arranged side by side with the terminals arranged in two rows and wherein the first battery cell is arranged adjacent to the second battery cell.

11. The battery pack according to claim 10, wherein the battery cells are arranged in opposite directions so that the first terminal of the first battery cell is arranged in the same row of terminals as the second terminal of the second battery cell, wherein the first metal plate is connected to the first terminal of the first battery cell and to the second terminal of the adjacent second battery cell so as to connect the first and second battery cells in series.

12. The battery pack according to claim 10, wherein the battery cells are arranged in similar directions so that the first terminal of the first battery cell is arranged in the same row of terminals as the first terminal of the second battery cell, wherein the first metal plate is connected to the first terminal of the first battery cell and to the first terminal of the second battery cell so as to connect the first and second battery cells in parallel.

13. The battery pack according to claim 1, wherein each battery cell comprises a casing enclosing the first and second cell electrodes and wherein the casing is electrically connected to the second cell electrode.

14. The battery pack according to claim 1, wherein the battery pack comprises a control system configured to control the electric heating element, wherein the control system is connected to the temperature sensor and arranged to control the electric heating element at least partly based on a signal obtained from the temperature sensor.

15. The battery pack according to claim 1, wherein the first metal plate is connected to the terminals by means of spot welding.

16. The battery pack according to claim 1, wherein the first metal plate is made of aluminium.

17. The battery pack according to claim 1, wherein the battery cells are of Li-ion type.

18. The battery pack according to claim 8, wherein the flexible material is a heating tape.

* * * * *